(12) United States Patent
Inoue et al.

(10) Patent No.: US 10,663,001 B2
(45) Date of Patent: May 26, 2020

(54) BALL BEARING CAGE

(71) Applicant: NTN CORPORATION, Osaka (JP)

(72) Inventors: Wakana Inoue, Kuwana (JP); Mineo Koyama, Kuwana (JP)

(73) Assignee: NTN CORPORATION, Osaka (JP)

(*) Notice: Subject to any disclaimer, the term of this patent is extended or adjusted under 35 U.S.C. 154(b) by 160 days.

(21) Appl. No.: 15/463,541

(22) Filed: Mar. 20, 2017

(65) Prior Publication Data
US 2017/0191528 A1 Jul. 6, 2017

Related U.S. Application Data

(63) Continuation of application No. PCT/JP2015/076505, filed on Sep. 17, 2015.

(30) Foreign Application Priority Data

Sep. 30, 2014 (JP) .................................. 2014-199923
Jan. 26, 2015 (JP) .................................. 2015-012108

(51) Int. Cl.
F16C 33/38 (2006.01)
F16C 33/44 (2006.01)
F16C 19/16 (2006.01)

(52) U.S. Cl.
CPC .......... F16C 33/3887 (2013.01); F16C 33/38 (2013.01); F16C 33/3843 (2013.01);
(Continued)

(58) Field of Classification Search
CPC .............. F16C 33/3856; F16C 33/3887; F16C 19/364; F16C 19/16; F16C 33/38;
(Continued)

(56) References Cited

U.S. PATENT DOCUMENTS 2,327,237 A * 8/1943 Baden .................. B23P 15/003
29/898.067
3,588,207 A * 6/1971 Greby ..................... F16C 33/38
384/533
(Continued)

FOREIGN PATENT DOCUMENTS

CN 1538081 10/2004
GB 2 132 287 A 7/1984
(Continued)

OTHER PUBLICATIONS

EPO Machine Translation of JP2007147010, Kosugi, Jun. 14, 2007 (Year: 2007).*

(Continued)

*Primary Examiner* — Vinh Luong

(57) ABSTRACT

A ball bearing retainer holds balls disposed between an inner ring and an outer ring, in pockets formed at a plurality of portions, in a circumferential direction, of an annular body. The annular body includes: annular parts disposed on both sides in an axial direction; and pillar parts that are disposed at a plurality of portions in the circumferential direction and that connect between the annular parts. The pockets are formed by the annular parts and the pillar parts adjacent to each other in the circumferential direction, and allow ball guide. First contact portions of the pillar portions, which contact portions contact with the balls in the circumferential direction, are formed by first planes that extend along the axial direction, and the balls are guided by the first planes.

11 Claims, 7 Drawing Sheets

(52) U.S. Cl.
CPC .......... *F16C 33/3856* (2013.01); *F16C 19/16* (2013.01); *F16C 33/44* (2013.01); *F16C 2208/02* (2013.01); *F16C 2208/20* (2013.01); *F16C 2208/36* (2013.01); *F16C 2208/60* (2013.01); *F16C 2240/70* (2013.01); *F16C 2322/39* (2013.01)

(58) Field of Classification Search
CPC .. F16C 33/385; F16C 33/467; F16C 33/4629; B23P 15/003
See application file for complete search history.

(56) References Cited

U.S. PATENT DOCUMENTS

| | | | | |
|---|---|---|---|---|
| 3,707,753 | A * | 1/1973 | Bailey, Jr. | F16C 33/3831 |
| | | | | 29/898.067 |
| 3,839,531 | A * | 10/1974 | Parkinson | B29C 45/2628 |
| | | | | 264/328.1 |
| 4,502,740 | A * | 3/1985 | Ohura | F16C 33/4676 |
| | | | | 29/898.067 |
| 4,560,291 | A | 12/1985 | Bonengel et al. | |
| 4,653,938 | A | 3/1987 | Fenwick | |
| 4,838,712 | A * | 6/1989 | Kubo | F16C 33/3887 |
| | | | | 384/523 |
| 5,906,441 | A | 5/1999 | Seki | |
| 6,132,102 | A * | 10/2000 | Bessone | F16C 33/543 |
| | | | | 384/576 |
| 6,955,476 | B1 * | 10/2005 | Murai | F16C 33/385 |
| | | | | 384/572 |
| 7,059,776 | B2 | 6/2006 | Kobayashi et al. | |
| 7,594,761 | B2 * | 9/2009 | Koyama | F16C 19/26 |
| | | | | 384/450 |
| 8,348,514 | B2 * | 1/2013 | Schweitzer | F16C 33/4611 |
| | | | | 384/579 |
| 8,721,188 | B2 * | 5/2014 | Fandre | F16C 33/4629 |
| | | | | 384/572 |
| 2003/0077015 | A1 | 4/2003 | Sugimori et al. | |
| 2004/0234181 | A1 | 11/2004 | Kobayashi et al. | |
| 2008/0118198 | A1 * | 5/2008 | Tsumori | B21D 53/12 |
| | | | | 384/623 |
| 2009/0060407 | A1 | 3/2009 | Tachi et al. | |
| 2011/0069918 | A1 * | 3/2011 | Wakuda | F16C 33/3887 |
| | | | | 384/482 |
| 2014/0193111 | A1 * | 7/2014 | Kenmochi | F16C 33/3887 |
| | | | | 384/572 |
| 2016/0178007 | A1 * | 6/2016 | Koyama | F16C 33/3856 |
| | | | | 384/527 |
| 2018/0119735 | A1 * | 5/2018 | Hayashi | F16C 19/364 |
| 2018/0363706 | A1 * | 12/2018 | Neukirchner | F16C 33/6614 |

FOREIGN PATENT DOCUMENTS

| | | |
|---|---|---|
| JP | 9-236127 | 9/1997 |
| JP | 3611918 | 10/2004 |
| JP | 2004-316852 | 11/2004 |
| JP | 2004-324699 | 11/2004 |
| JP | 2006-161882 | 6/2006 |
| JP | 2007-147010 | 6/2007 |
| JP | 2008-133894 | 6/2008 |
| JP | 4192515 | 10/2008 |
| JP | 2009-58039 | 3/2009 |
| JP | 2011-85153 | 4/2011 |
| JP | 2012-57730 A * | 2/2012 |
| WO | WO 2013081076 A1 * | 6/2013 |
| WO | WO 2017/047676 A1 * | 3/2017 |

OTHER PUBLICATIONS

Define continuously—Google Search, Jun. 24, 2019 (Year: 2019).*
Define thickness—Google Search, Oct. 10, 2019. (Year: 2019).*
Define distal end—Google Search, Oct. 10, 2019 (Year: 2019).*
International Preliminary Report on Patentability dated Apr. 13, 2017 in corresponding International Patent Application No. PCT/JP2015/076505.
Office Action dated Jun. 26, 2018, in corresponding Chinese Patent Application No. 201580052373.6, 4 pgs.
Extended European Search Report dated May 24, 2018, in corresponding European Patent Application No. 15847007.0, 29 pgs.
International Search Report dated Dec. 15, 2015 in corresponding International Application No. PCT/JP2015/076505.
Office Action dated Jul. 24, 2018, in corresponding Japanese Patent Application No. 2015-012108, 6 pgs.
Chinese Office Action dated Nov. 14, 2018 in corresponding Chinese Patent Application No. 201580052373.6.
Japanese Office Action dated Feb. 19, 2019 in corresponding Japanese Patent Application No. 2015-012108.
Taiwan Office Action dated Apr. 2, 2019 in corresponding Taiwan Patent Application No. 104131689 (5 pages).
Chinese Office Action dated Apr. 12, 2019 in corresponding Chinese Patent Application No. 201580052373.6 (4 pages).

* cited by examiner

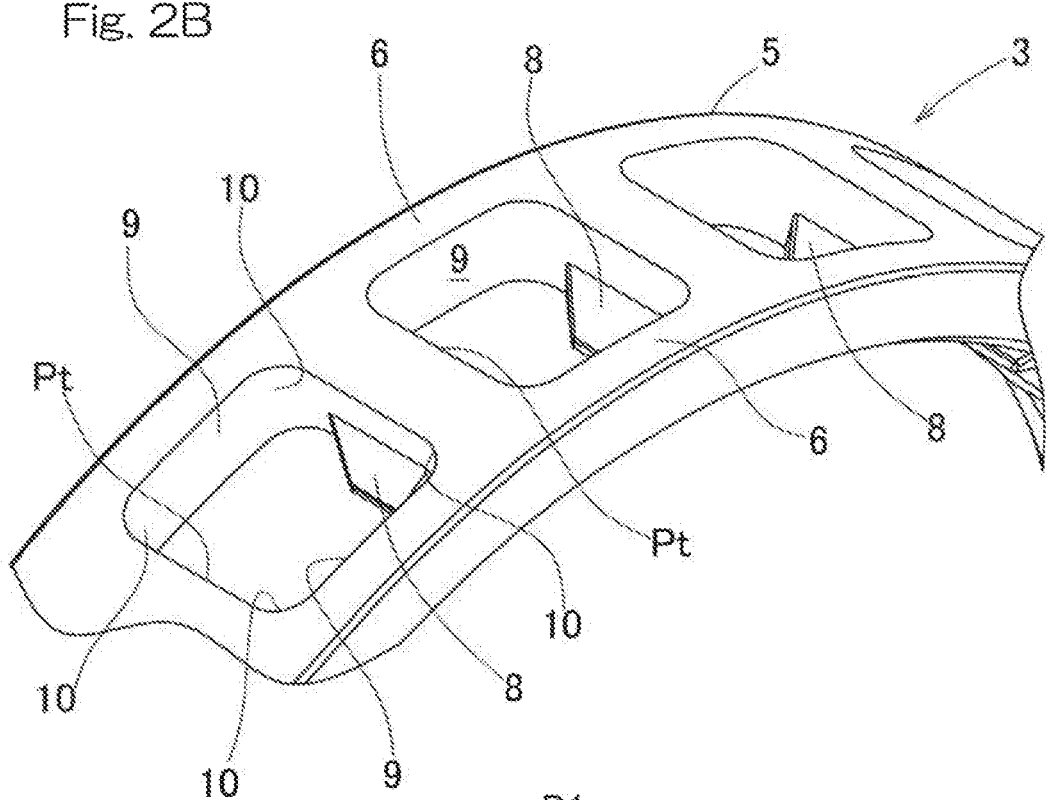
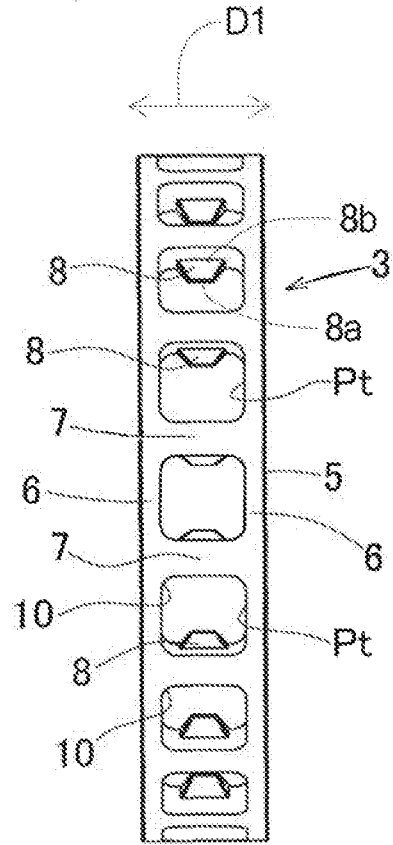

CONVENTIONAL RETAINER    DEVELOPED RETAINER

PRIOR ART

BALL BEARING CAGE

CROSS REFERENCE TO THE RELATED APPLICATION

This application is a continuation application under 35 U.S.C. § 111(a) of international patent application No. PCT/JP2015/076505, filed Sep. 17, 2015, which claims priority to Japanese patent application No. 2014-199923, filed Sep. 30, 2014, and Japanese patent application No. 2015-012108, filed Jan. 26, 2015, the entire disclosure of which is herein incorporated by reference as a part of this application.

BACKGROUND OF THE INVENTION (Field of the Invention)

The present invention relates to ball bearing retainers or cages used for, for example, spindles of machine tools.

(Description of Related Art)

An angular contact ball bearing used for a spindle of a machine tool is rotated at a high speed. Therefore, a metallic retainer having a high specific gravity is rarely used, and a retainer made of a resin, such as nylon polyamide, PPS (Poly Phenylene Sulfide Resin), PEEK (Poly Ether Ether Ketone), or phenolic resin, which is reinforced by glass fibers, carbon fibers, or the like is used.

In general, an inner diameter restriction type rolling element, guide retainer is used in intermediate and low speed ranges in many cases (for example, Patent Documents 1 to 3 listed below). Patent Documents 1, 2 disclose an inner diameter restriction type ball guide angular contact ball bearing. Patent Document 3 discloses an inner diameter restriction type ball guide retainer. Further, an outer diameter restriction type roller guide retainer is also suggested (Patent Document 4). The rolling element guide retainer is guided by (in contact with) balls which have been quality-controlled to have fine surface roughness with high accuracy, and the inner diameter surface of an outer ring and the outer diameter surface of an inner ring do not need to be finished by grinding, as distinct from an inner ring guide retainer and an outer ring guide retainer. Therefore, a rolling element guide retainer is excellent in cost as compared to an inner ring guide retainer and an outer ring guide retainer.

RELATED DOCUMENT

Patent Document

[Patent Document 1] JP Patent No. 3611918
[Patent Document 2] JP Laid-open Patent Publication No. H09-236127
[Patent Document 3] JP Patent No. 419251
[Patent Document 4] JP Laid-open Patent Publication No. 2006-161882

However, in a high speed range in which, for example, a $d_m n$ value that is a product of the rolling element center diameter $d_m$ (mm) and a rotation speed n $(min^{-1})$ exceeds one million, a rolling element guide retainer expands due to action of a centrifugal force, and a ball (rolling element) and a ball receiver portion (inner diameter side portion of the retainer in the case of an inner diameter restriction type) of the retainer come into hard contact with each other during the guiding in the radial direction. Therefore, resistance or heat generation at the ball receiver portion gradually increases, thereby developing into insufficient lubrication, and, in a worst case, into an abnormal wear or melting at the contact surface.

FIG. 8 is a cross-sectional view of an angular contact ball bearing in which a conventional ball bearing retainer is used. FIG. 9 is a perspective view of the ball bearing retainer. FIG. 10 is a plan view as viewed from the outer diameter side of the ball bearing retainer. As shown in FIG. 8 to FIG. 10, a conventional inner diameter restriction type rolling element guide retainer 30 has pockets Pt opened, each of pockets Pt is round as viewed from the radially outer side. That is, each pocket Pt has almost a cylindrical shape. FIG. 11 is a cross-sectional view taken along a line XI-XI in FIG. 8. Between an inner diameter restriction type ball receiver portion 31 and a ball 32, a gap "B" is formed when the retainer is positioned in a neutral position. Therefore, even if the retainer 30 is moved in the radial direction, ball guide is maintained so as to prevent the contact with an inner ring 33 and an outer ring 34.

If a bearing having the inner diameter restriction type rolling element guide retainer 30 is rotated at a high speed, the ball 32 and the pocket Pt may come into contact with each other at points Q in the circumferential direction of the ball revolution, due to expansion of the retainer 30 by a centrifugal force, whirling or run-out thereof, or the like, and the ball 32 may strongly engage with the pocket Pt of the retainer 30. As a result, resistance or heat generation due to contact between the ball 32 and the pocket Pt may be increased.

SUMMARY OF THE INVENTION

An object of the present invention is to provide a ball bearing retainer that allows high-speed operation while the ball bearing retainer is guided by balls.

A ball bearing retainer of the present invention is directed to a ball guide retainer for a ball bearing which bearing includes: an inner ring; an outer ring; and balls interposed between the inner ring and the outer ring. The retainer includes an annular body formed with pockets at a plurality of portions thereof in a circumferential direction, the pockets holding the respective balls, in which case: the annular body includes annular parts and pillar parts, the annular parts being disposed on both sides in an axial direction, the pillar parts being disposed at a plurality of portions spaced in the circumferential direction and connecting between the annular parts; and the pockets are formed by the annular parts on both the sides in the axial direction and the pillar parts adjacent to each other in the circumferential direction. First contact portions of the pillar portions, which contact portions contact with the balls in the circumferential direction, are formed by first planes that extend along the axial direction, and the balls are guided by the first planes.

In this configuration, a first contact portion of each pillar part, which contact portion contacts with the ball in the circumferential direction, is formed by the first plane that extends along the axial direction. Thus, a contact area which contacts with the ball can be reduced as compared to a round hole contact portion of a conventional inner diameter restriction type rolling element guide retainer. Therefore, heat generation that occurs partially at the first contact portion can be reduced. Accordingly, in the ball bearing retainer of the present invention, even when a centrifugal force acts in high-speed operation, heat generation at the ball and the first contact portion can be reduced, and high speed operation can be thus performed. Further, since ball guide is performed, the inner diameter surface of the outer ring and the outer diameter surface of the inner ring need not be finished by grinding, whereby the number of steps for processing can be reduced.

Second contact portions of the annular parts, which contact portions contact with the balls in the axial direction, may be formed by second planes that extend along the circumferential direction, and the balls may be guided by the second planes. In this case, since the ball is guided by the first planes of the pillar parts and the second planes of the annular parts, a load due to contact between the ball and the pocket can be separated into a load that acts in the bearing rotation direction and a load that acts in the axial direction. Therefore, a contact area which contacts with the ball can be reduced as compared to a conventional inner diameter restriction type retainer, and heat generation that occurs partially at the contact portion can be reduced.

Connection regions that connect between the pillar parts and the annular parts may have each a roundly-chamfered R-shape or an arc-shape. In this case, spaces for lubrication are formed between the ball and the connection regions having the R-shape or the arc-shape. In the case of air oil lubrication, by the "spaces" being formed, oil can be smoothly supplied and discharged, and an appropriate amount of oil is constantly supplied to the contact portion between the ball and the retainer pocket. In the case of grease lubrication, the "spaces" contribute to holding of grease in the vicinity of the contact portion, and the grease held in the "spaces" is supplied to the ball and the retainer pocket. As a result, lubrication reliability in a high speed operation is enhanced, and friction and wear due to contact are reduced.

Connection regions that connect between the pillar parts and the annular parts may have each an arc-shape, arc-shaped regions of the connection regions may have each an arc-shaped surface obtained by an arc center being offset from a center of a corresponding one of the pockets, and a gap may be formed between the arc-shaped surface and each ball. In this case, a gap for lubrication is formed between each arc-shaped connection region and the ball. In the case of air oil lubrication, by the "gap" being formed, oil can be smoothly supplied and discharged, and an appropriate amount of oil is constantly supplied to the contact portion between the ball and the retainer pocket. In the case of grease lubrication, the "gap" contributes to holding of grease in the vicinity of the contact portion, and the grease held in the "gap" is supplied to the ball and the retainer pocket. As a result, lubrication reliability in a high speed operation is enhanced, and friction and wear due to contact are reduced.

A radius of each connection region may be greater than or equal to 15% of a total width, in the axial direction, of each pocket. The radius of each connection region is determined, for example, based on a result of a test, simulation or the like. When the radius of the connection region is limited to the above numerical values, lubrication reliability in a high speed operation can be further enhanced.

The ball bearing retainer of the present invention may be tailored to be used for an angular contact ball bearing or may be made of a resin. The ball bearing retainer made of a resin may be an injection molding product. In this case, as compared to production of retainers by machining, excellent mass productivity is obtained and cost can be reduced.

The annular body may include two annular segments that confront each other in the axial direction of the annular body, and the pockets may be formed by the annular segments being combined so as to confront each other in the axial direction. In this case, a plurality of balls are inserted between raceway surfaces of the inner ring and the outer ring, and thereafter the two annular segments are combined from both sides in the axial direction, whereby the retainer can be easily assembled. When the retainer is made of a resin and the two annular segments have the same shape, the two annular segments can be formed by using one kind of forming mold. Accordingly, cost for the mold and cost for the retainer can be thus reduced. Further, the two annular segments to be combined need not be separately handled, and as a result, the annular segments can be easily managed.

A ball bearing of the present invention may be an angular contact ball bearing, for a spindle of a machine tool, which includes the retainer of the present invention.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2B is an enlarged view of a main portion in FIG. 2A;

FIG. 3A is a plan view of the ball bearing retainer as viewed from the outer diameter side;

DESCRIPTION OF EMBODIMENTS

Figure 1:
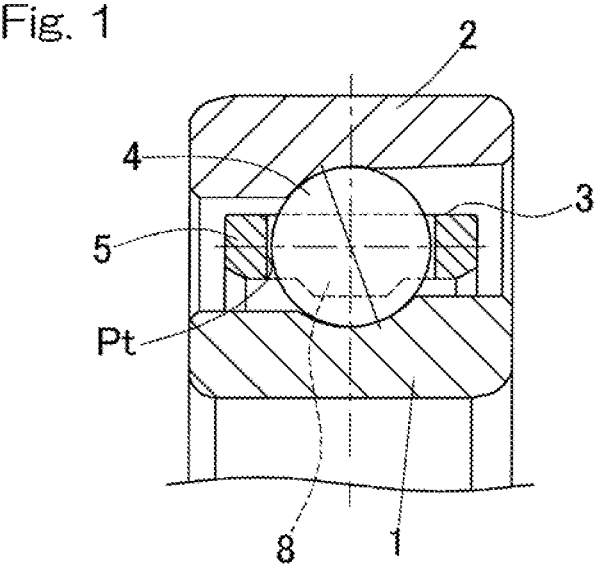
FIG. 1 is a cross-sectional view of an angular contact ball bearing using a ball bearing retainer according to a first embodiment of the present invention.

A first embodiment of the present invention will be described with reference to FIG. 1 to FIG. 4. A ball bearing retainer or cage according to the present embodiment is applied particularly to a retainer of an angular contact ball bearing for a spindle of a machine tool. FIG. 1 is a cross-sectional view of an angular contact ball bearing using the ball bearing retainer. The angular contact ball bearing includes: an inner ring 1; an outer ring 2; balls 4 interposed between the inner ring 1 and the outer ring 2; and a retainer 3 for retaining the balls 4. The retainer 3 is an inner diameter restriction type ball guide retainer. The balls 4 are formed as, for example, steel balls or ceramic balls.

The retainer 3 includes an annular body 5 having therein pockets Pt formed at a plurality of portions along the circumferential direction thereof, and retains the balls 4, which are disposed between the inner ring 1 and the outer ring 2, in the pockets Pt. The retainer 3 is made of, for example, a resin, and is produced by injection molding. As a resin material used for the retainer 3, a super engineering plastic, typified by a highly rigid PEEK resin that is advantageous in high speed rotation, which contains 20 to 40% of carbon fibers or glass fibers, or an engineering plastic, typified by a cost-friendly polyamide resin, which contains 20 to 40% of carbon fibers or glass fibers, can be used.

Figure 2A:
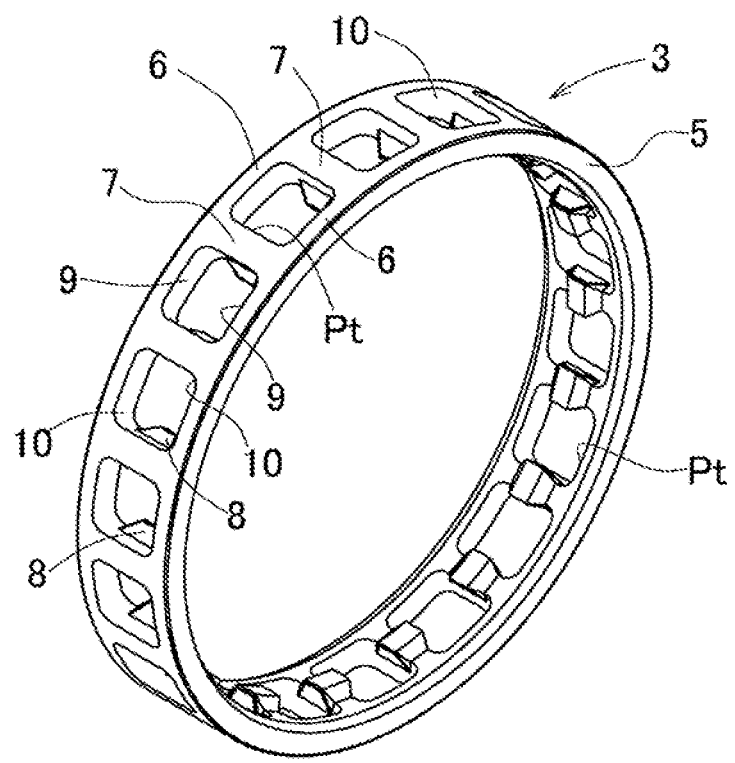
FIG. 2A is a perspective view of the ball beating retainer.
Figure 3B:
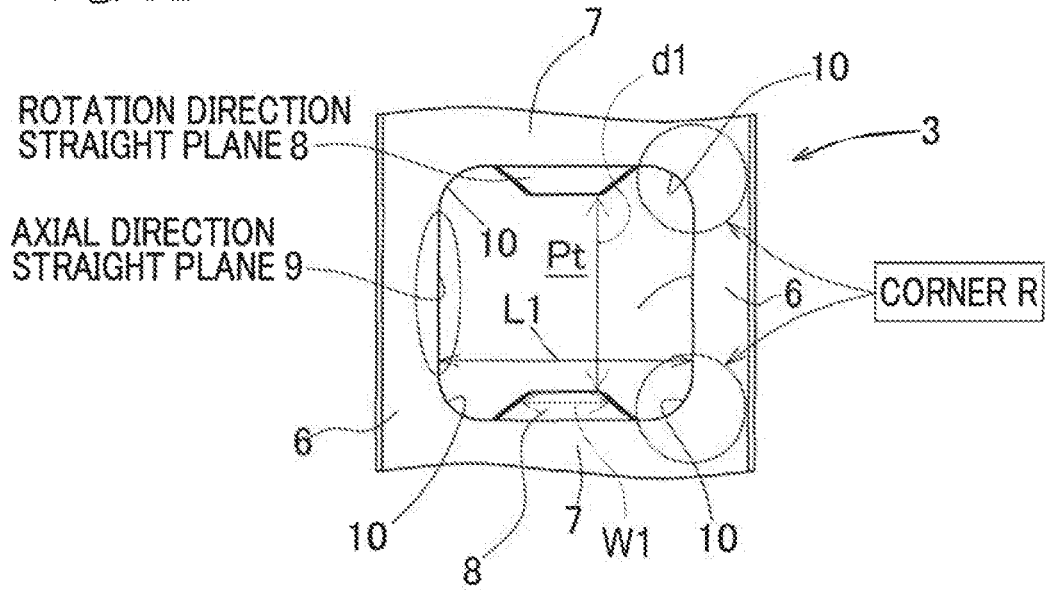
FIG. 3B is an enlarged view of a main portion in FIG. 3A.

FIG. 2A is a perspective view of the retainer 3, and FIG. 2B is an enlarged view of a main portion in FIG. 2A. FIG. 3A is a plan, view of the retainer 3 as viewed from the outer diameter side, and FIG. 3B is an enlarged view of a main portion in FIG. 3A. As shown in FIG. 2A to FIG. 3B, the annular body 5 of the retainer 3 has: annular parts 6, 6 disposed on both sides in the axial direction; and pillar parts 7 disposed at a plurality of portions spaced in the circumferential direction so as to connect between the annular parts 6 and 6. Each pocket Pt is formed by the annular parts 6, 6, on both the sides in the axial direction, and the pillar parts 7, 7 adjacent to each other in the circumferential direction.

As shown in FIG. 2B and FIG. 3B, each pocket Pt is formed in a substantially rectangular shape in a planar view when the retainer 3 is viewed from the outer diameter side. In each pocket Pt, a pair of the pillar parts 7, 7 are disposed so as to confront each other in the circumferential direction. First contact portions in the pillar parts 7, which contact with the ball 4 (FIG. 1), are formed by first planes 8 that extend along the axial direction. The ball 4 (FIG. 1) is guided by the first planes 8. The first plane 8 of each pillar part 7 is referred to as a "rotation direction straight plane 8".

The two rotation direction straight planes 8, 8 in each pocket Pt extend radially inward from portions adjacent to the mid-positions of the respective pillar parts 7 in the thickness direction D1, over a predetermined distance, such that the distance dl between the first planes 8, 8 in the circumferential direction is gradually reduced toward the distal ends 8a, 8a of the first planes 8, 8. Each rotation direction straight plane 8 has a width W1 (dimension in the axial direction) that is reduced from the proximal end 8b of the first plane 8 toward the distal end 8a of the first plane. The retainer 3 is formed as a ball guide inner diameter restriction type retainer by the rotation direction straight planes 8 in the pillar parts 7.

Second contact portions of the annular parts 6 in the axial direction are formed by second planes 9 that extend along the circumferential direction. The ball 4 (FIG. 1) is guided also by the second planes 9. Each second plane 9 of the annular part 6 is referred to as an "axial direction straight plane 9". In each pocket. Pt, the two axial direction straight planes 9, 9 are formed parallel to each other. The ball 4 (FIG. 1) is guided by the rotation direction straight planes 8 and the axial direction straight planes 9. Therefore, a load due to contact between the ball 4 (FIG. 1) and the pocket Pt can be separated into a load that acts in the bearing rotation direction and a load that acts in the axial direction.

Connection regions 10 that connect between the pillar parts 7 and the annular parts 6 are each formed into a roundly-chamfered R-shape or arc-shape. The arc center of the R shape or the arc shape is positioned in the pocket Pt. The connection regions 10 are formed at four corners, respectively, of each pocket Pt that is shaped into a substantially rectangular shape. The radius of each connection region 10 is greater than or equal to 15% of the total width L1, in the axial direction, of the pocket Pt. The radius of each connection region 10 is determined, for example, according to a result of a test, simulation or the like.

Figure 4:
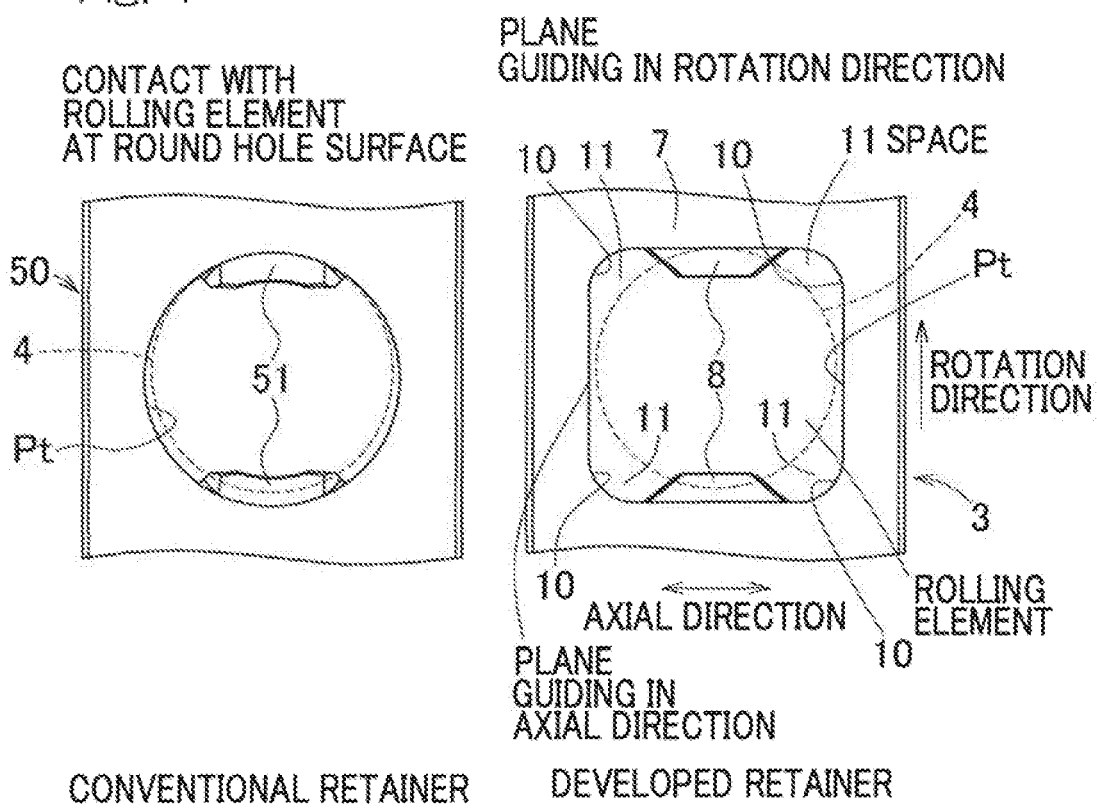
FIG. 4 illustrates comparison between the ball bearing retainer and a conventional retainer.

FIG. 4 illustrates comparison between the retainer 3 (on the right side in FIG. 4) of the present embodiment and a conventional retainer 50 (on the left side in FIG. 4). In the conventional retainer 50 the ball 4 contacts with a round hole surface 51 of a pocket Pt, whereas in the retainer 3 of the present embodiment the ball 4 contacts with the rotation direction straight planes 8 of the pocket Pt.

Further, in the retainer 3 of the present embodiment, spaces 11 for lubrication are formed between the ball 4 and the connection regions 10 having the R-shape or the arc-shape. In the case of air oil lubrication, by the spaces 11 being formed, oil can be smoothly supplied and discharged, and an appropriate amount of oil is constantly supplied to the contact portion between the ball 4 and the retainer pocket Pt. In the case of grease lubrication, the spaces 11 contribute to holding of grease in the vicinity of the contact portion, and the grease held in the spaces 11 is supplied to the ball 4 and the retainer pocket Pt. As a result, lubrication reliability in a high speed operation is enhanced, and friction and wear due to contact are reduced.

In the retainer 3 described above, a first contact portion of each pillar part 7, which contacts with the ball 4 in the circumferential direction, is formed by the first plane 8 that extends along the axial direction. Thus, a contact area which contacts with the ball 4 can be reduced as compared to a round hole contact portion of a conventional inner diameter restriction type rolling element guide retainer. As a result, heat generation that occurs partially at the contact portion can be reduced. Therefore, in the ball bearing retainer 3 of the present embodiment, even when a centrifugal force acts in high-speed operation, heat generation at the ball 4 and the first contact portion can be reduced, and high speed operation can be performed. Further, since ball guide is performed, the inner diameter surface of the outer ring and the outer diameter surface of the inner ring need not be finished by grinding, whereby the number of steps for processing can be reduced.

The second contact portion of each annular part 6, which contacts with the ball 4 in the axial direction, is formed by the second plane 9 that extends, along the circumferential direction, and the ball 4 is guided by the second plane 9. The ball 4 is guided by the first planes 8 of the pillar parts 7 and the second planes 9 of the annular parts 6, and therefore, a load due to contact between the ball 4 and the pocket Pt can be separated into a load that acts in the bearing rotation direction and a load that acts in the axial direction. Accordingly, a contact area which contacts with the ball can be reduced as compared to a conventional inner diameter restriction type retainer, and heat generation that occurs partially at the contact portion can be reduced.

Other embodiments will be described.

In the following description, components corresponding to the matters described in the embodiment preceding each embodiment are denoted by like reference numerals, and description thereof is not repeated. In a case where only a portion of the configuration is, described, the other portions of the configuration are the same as described in the preceding embodiments, unless otherwise specified. The same function and effect can be obtained from the same configuration. Not only portions that are specifically described in the embodiments may be combined, but also the embodiments may be partially combined unless any problem arises in the combination.

Figure 5:
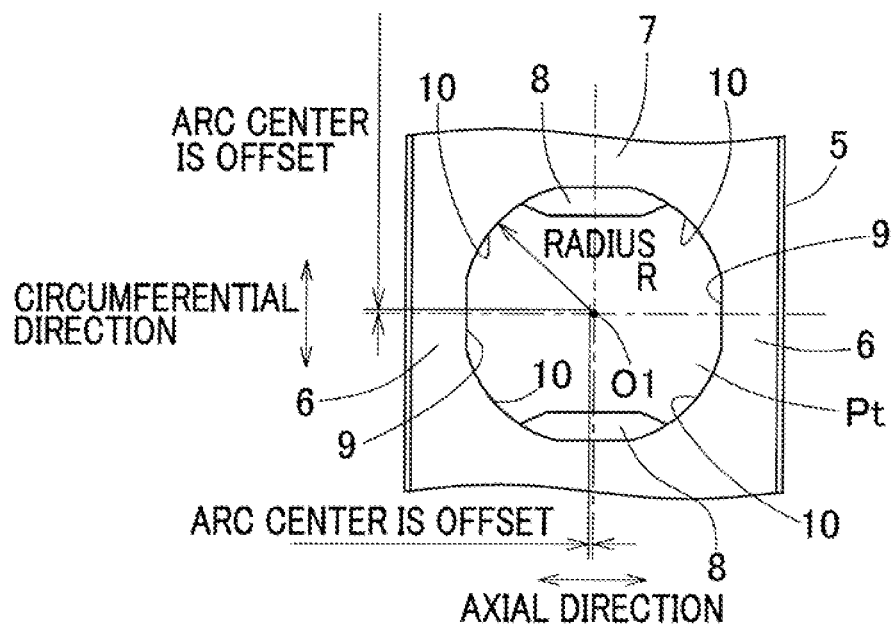
FIG. 5 is an enlarged plan view of a main portion of a ball bearing retainer, as viewed from the outer diameter side, according to a second embodiment of the present invention.

In a second embodiment shown in FIG. 5, connection regions 10 that connect between the pillar parts 7 and the annular parts 6 are each arc-shaped. The arc-shaped portion of each connection region 10 is formed by an arc-shaped surface obtained by the arc center being offset from the center O1 of the pocket Pt in the axial direction and the circumferential direction. A gap is formed between each arc-shaped surface and the ball.

Figure 6:
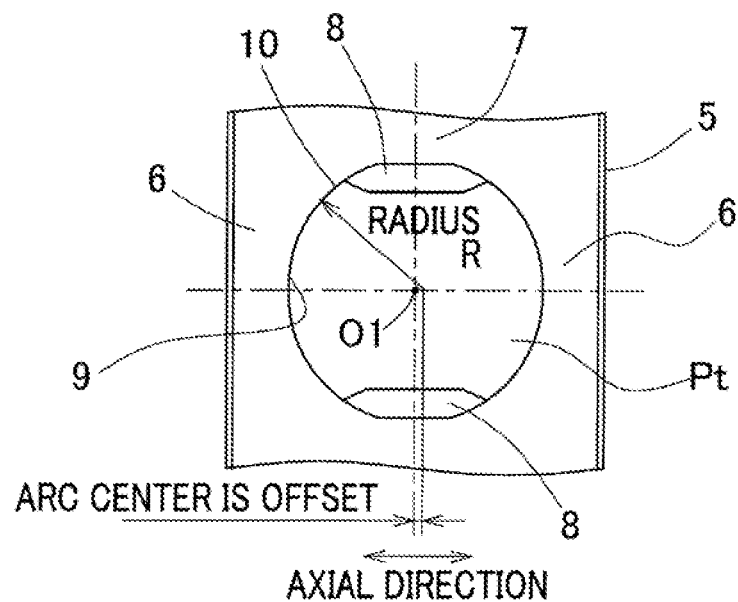
FIG. 6 is an enlarged plan view of a main portion of a ball bearing retainer, as viewed from the outer diameter side, according to a third embodiment of the present invention.

In a third embodiment, shown in FIG. 6, arc-shaped portions of connection regions 10 are each formed by an arc-shaped surface obtained by the arc center being offset from the center O1 of the pocket Pt in the axial direction. A gap is formed between each arc-shaped surface and the ball.

In the second and the third embodiments, gaps for lubrication are formed between the arc-shaped connection regions 10 and the ball. In the case of air oil lubrication, by the "gaps" being formed, oil can be smoothly supplied and discharged, and an appropriate amount of oil is constantly supplied to the contact portion between the ball and the retainer pocket Pt. In the case of grease lubrication, the gaps contribute to holding of grease in the vicinity of the contact portion, and the grease held in the gaps is supplied to the ball and the retainer pocket Pt. As a result, lubrication reliability in a high speed operation is enhanced, and friction and wear due to contact are reduced.

Figure 7:
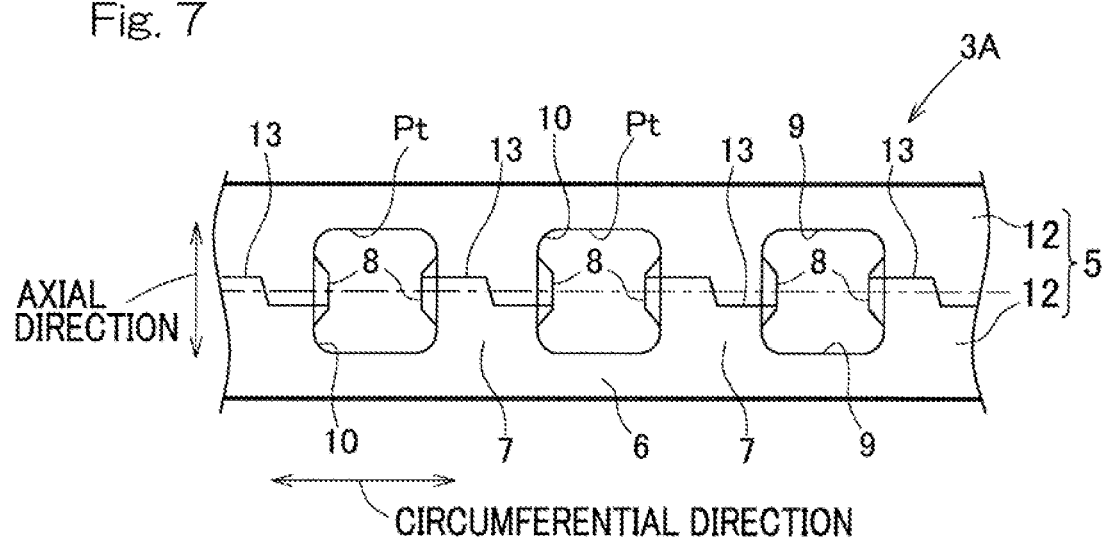
FIG. 7 is a plan view of a main portion of a ball bearing retainer, as viewed from the outer diameter side, according to a fourth embodiment of the present invention.
Figure 8:
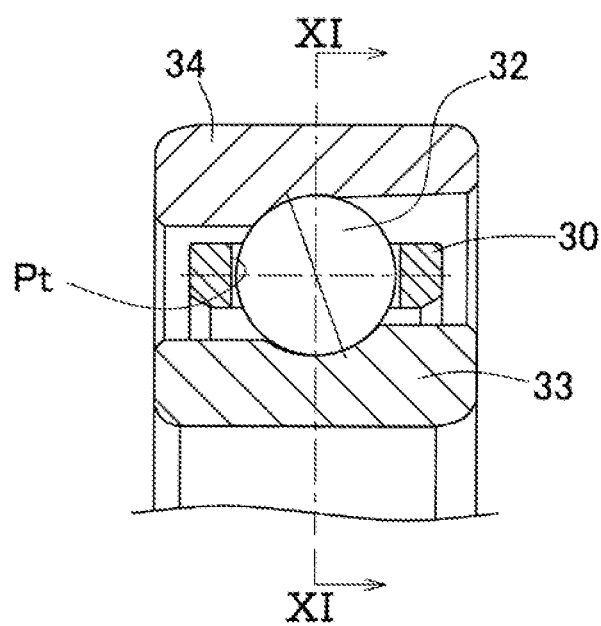
FIG. 8 is a cross-sectional view of an angular contact ball bearing using a conventional ball bearing retainer.
Figure 9:
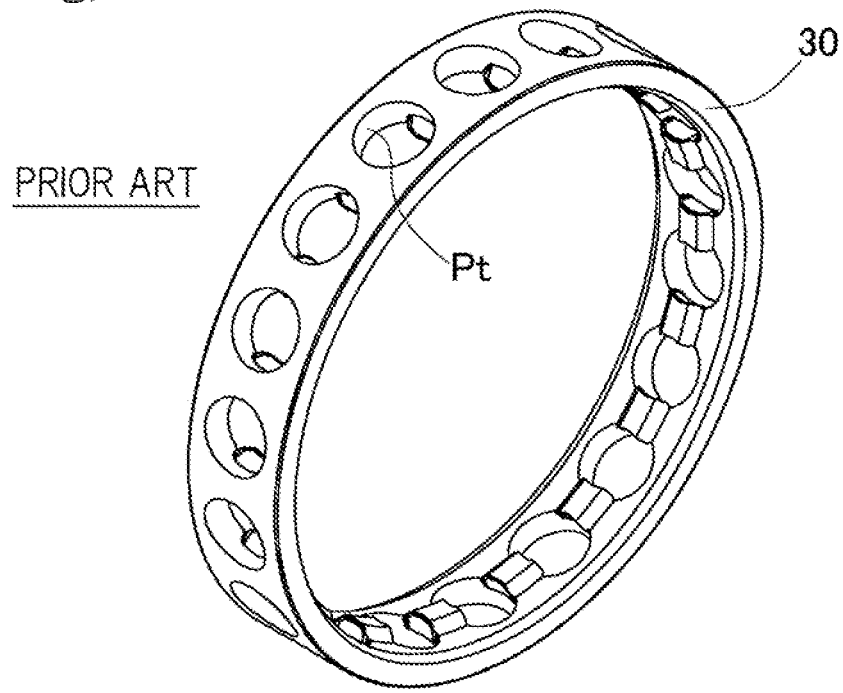
FIG. 9 is a perspective view of the ball bearing retainer.
Figure 10:
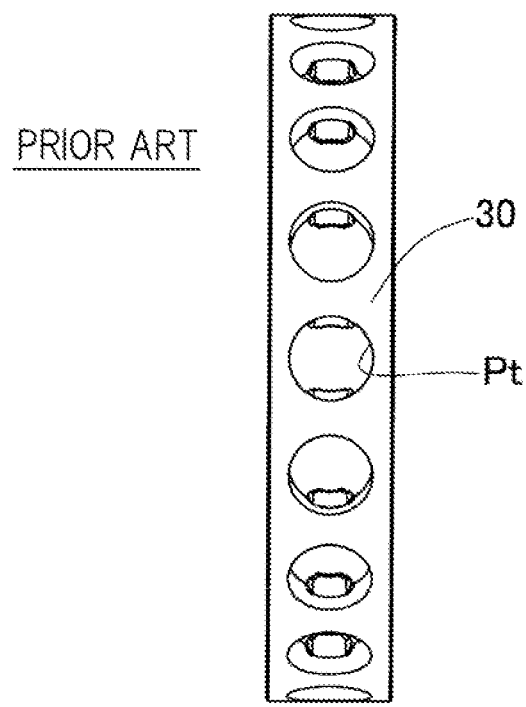
FIG. 10 is a plan view of the ball bearing retainer as viewed from the outer diameter side.
Figure 11:
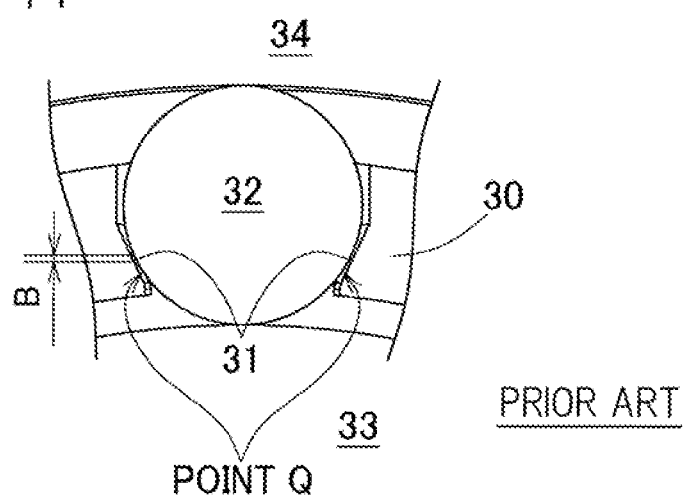
FIG. 11 is a cross-sectional view taken along a line XI-XI in FIG. 8.

In a fourth embodiment shown in FIG. 7, an annular body 5 of a retainer 3A has two divisional annular segments 12, 12 that can be divided in the axial direction. The two annular segments 12, 12 are combined, thereby forming the retainer 3A having a plurality of pockets Pt. In the fourth embodiment, the two annular segments 12, 12 have the same shape, and are combined with each other while being disposed oppositely in the axial direction. In this case, each pillar part 7 has an engagement surface 13 at which the two annular segments 12, 12 come into surface contact with each other when combined. The engagement surface 13 is formed by a plane that is perpendicular to the axial direction except for a portion adjacent to the center portion, in the circumferential direction, of each pillar part 7. The engagement surface 13 is formed at a position that axially deviates from the center, in the axial direction, of the annular body 5.

In the retainer 3A of the fourth embodiment, the two divisional annular segments 12, 12 that can be divided in the axial direction are combined so as to confront, each other in the axial direction, whereby the annular body 5 having a plurality of pockets Pt, is formed. Therefore, a plurality of balls 4 (FIG. 1) are inserted between raceway surfaces of the inner ring 1 and the outer ring 2 (FIG. 1), and thereafter the two annular segments 12, 12 are combined from both sides in the axial direction, whereby the retainer 3A can be easily assembled.

The retainer 3A is made of a resin, and the two annular segments 12, 12 have the same shape. Therefore, the two annular segments 12, 12 can be formed by using one kind of forming mold. Accordingly, cost for the mold and cost for the retainer 3A can be thus reduced. Further, the two annular segments 12, 12 to be combined need not be separately handled and the annular segments 12 can be easily managed.

The present invention has been fully described in connection with the embodiments. However, the embodiments disclosed herein are in all aspects illustrative and not restrictive. The scope of the present invention is to be determined not by the above explanation but by the appended claims, and includes equivalents of the claims and all modifications within the scope of the present invention.

REFERENCE NUMERALS

1 . . . inner ring
2 . . . outer ring
3, 3A . . . retainer
4 . . . ball
5 . . . annular body
6 . . . annular part
7 . . . pillar part
8 . . . rotation direction straight plane (first plane)
9 . . . axial direction straight plane (second plane)
10 . . . connection region
12 . . . annular segment
Pt . . . pocket

What is claimed is:

1. A ball guide retainer for a ball bearing including an inner ring, an outer ring, and balls interposed between the inner ring and the outer ring, the retainer comprising:
an annular body formed with pockets at a plurality of portions thereof in a circumferential direction, the pockets holding the respective balls, wherein
the annular body includes annular parts and pillar parts, the annular parts being disposed on both sides in an axial direction, the pillar parts being disposed at a plurality of portions spaced in the circumferential direction and connecting between the annular parts,
the pockets are formed by the annular parts on both the sides in the axial direction and the pillar parts adjacent to each other in the circumferential direction, and
first contact portions of the pillar parts are formed by first planes, each of the first planes being continuously planar along the axial direction, the balls are guided by the first planes, and the first contact portions are configured to contact the balls in the circumferential direction,
wherein two of the first planes extend radially inward from portions adjacent to mid-positions of the respective pillar parts in the thickness direction, over a predetermined distance, such that the distance between the first planes in the circumferential direction is gradually reduced toward the distal ends thereof, and
wherein each of the first planes has a width dimension in the axial direction that is reduced from the proximal end thereof toward the distal end thereof.

2. The retainer for the ball bearing as claimed in claim 1, wherein, second contact portions of the annular parts are formed by second planes that extend along the circumferential direction, the balls are guided by the second planes, and the second contact portions are configured to contact the balls in the axial direction.

3. The retainer for the ball bearing as claimed in claim 2, wherein connection regions that connect between the pillar parts and the annular parts have each a roundly-chamfered R-shape or an arc-shape.

4. The retainer for the ball bearing as claimed in claim 3, wherein a radius of each connection region is greater than or equal to 15% of a total width, in the axial direction, of each pocket.

5. The retainer for the ball bearing as claimed in claim 2, wherein
connection regions that connect between the pillar parts and the annular parts have each an arc-shape, arc-shaped regions of the connection regions have each an arc-shaped surface obtained by an arc center being offset from a center of a corresponding one of the pockets, and a gap is formed between the arc-shaped surface and each ball.

6. The retainer for the ball bearing as claimed in claim 1, wherein the retainer is tailored to be used for an angular contact ball bearing.

7. The retainer for the ball bearing as claimed in claim 1, wherein the retainer includes a resin.

8. The retainer for the ball bearing as claimed in claim 7, wherein the retainer is an injection molding product.

9. The retainer for the ball bearing as claimed in claim 1, wherein the annular body includes two annular segments that confront each other in the axial direction of the annular body, and the pockets are formed by the annular segments being combined so as to confront each other in the axial direction.

10. An angular contact ball bearing comprising the retainer as claimed in claim 1.

11. The retainer for the ball bearing as claimed in claim 1, wherein second contact portions of the annular parts are formed by second planes, each of the second planes being continuously planar along the circumferential direction, the balls are guided by the second planes, and the second contact portions are configured to contact the balls in the axial direction.

\* \* \* \* \*